Oct. 23, 1951  E. O. HOWLE  2,572,483
METHOD FOR EXPANDING PERLITE
Original Filed Sept 17, 1947

Inventor.
Ernest O. Howle
by Roland C. Cohn
Attorney.

Patented Oct. 23, 1951

2,572,483

UNITED STATES PATENT OFFICE 2,572,483

METHOD FOR EXPANDING PERLITE

Ernest O. Howle, Chicago, Ill.

Original application September 17, 1947, Serial No. 774,614. Divided and this application July 16, 1948, Serial No. 39,048

5 Claims. (Cl. 252—378)

This invention relates to the expansion of perlite, and among other objects, aims to provide a method of and means for more efficiently expanding perlite.

Another object of the invention is to increase the yield of expanded perlite.

Another object is to minimize over-heating of the perlite by removing it from the zone of expanding temperatures as soon as it has expanded.

A further object is to effect separation between the expanded perlite and unexpandable and unexpanded materials.

The nature of the invention and other objects and advantages thereof will readily appear by reference to one illustrative method and apparatus embodying the invention and described in the following specification and illustrated in the accompanying drawing.

Figure 1:
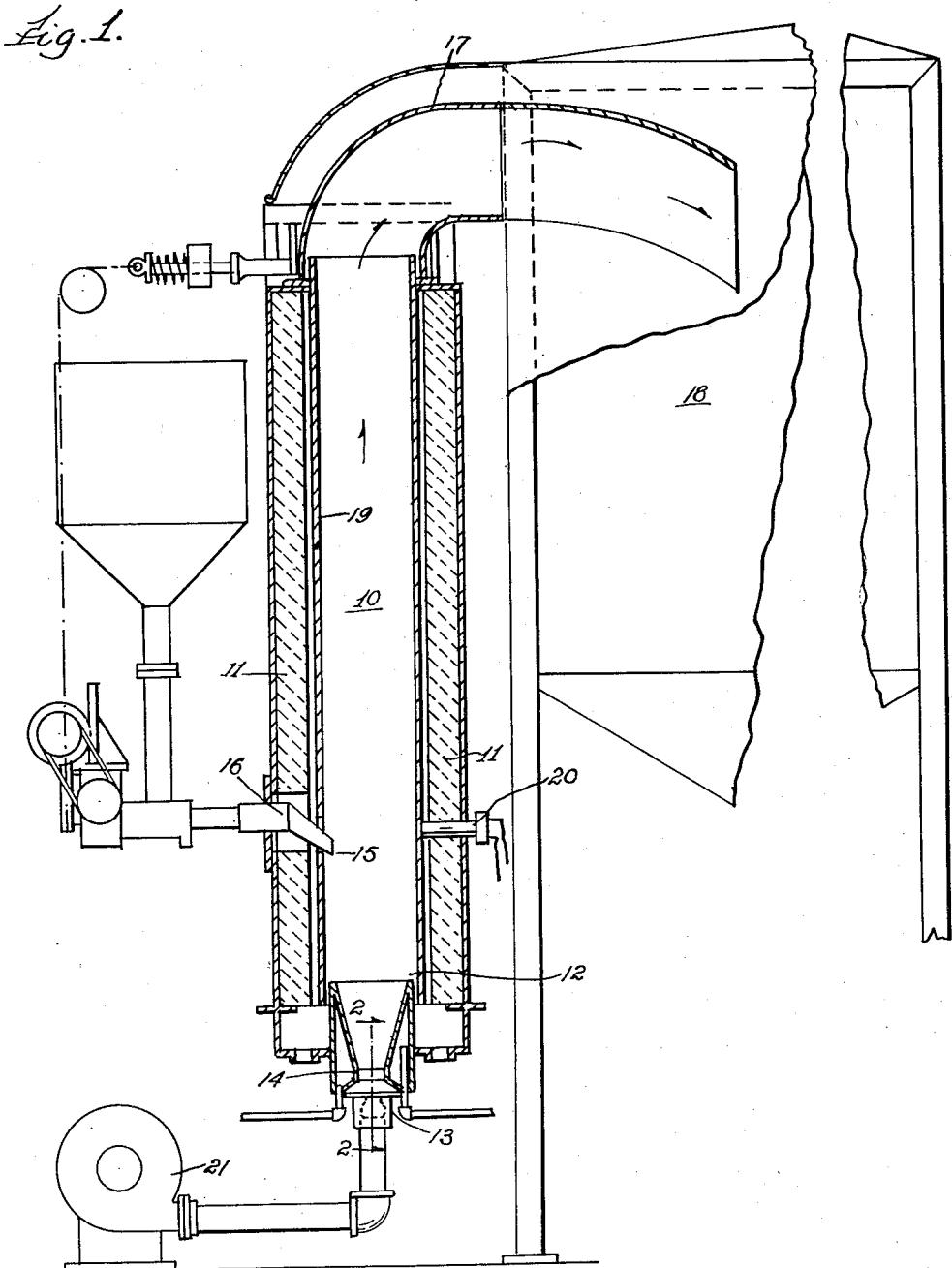
Fig. 1 is a sectional elevation of an expanding furnace.
Figure 2:
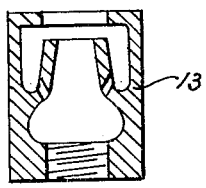
Fig. 2 is a section, on a larger scale, taken on the plane 2—2 of Figure 1, of a burner nozzle of the flame retention type.

This application is a division of co-pending application Serial No. 774,614, filed September 17, 1947, which in turn is a continuation in part of application Serial No. 684,452, filed July 18, 1946, now abandoned. This application covers the generic features of the method and apparatus for expanding perlite also disclosed and originally claimed in said co-pending applications.

Perlite is a siliceous material of volcanic origin and rhyolitic in composition. It contains about 2 to 5% of "combined" water. When quickly heated to its softening temperature range the steam formed puffs the material to many times its original size to produce a material of very low bulk density, e. g., 2 to 14 pounds per cubic foot, depending on the degree and efficiency of expansion. For convenience, the term perlite is here used in a generic sense to include all expandable volcanic glasses. Perlite differs considerably, depending on the locality where found, in the time required for expansion, and in its softening range. The softening range is generally somewhere between 1600 degrees F. to 2600 degrees F. A relatively wide softening range is desirable to permit more efficient and better control of expansion. It is difficult to prevent the material in its softened condition from cohering or agglomerating and from adhering to the walls of the expanding furnace, with the result that much material is wasted and frequently removal of the layer of glass from the walls of the furnace is necessary. In this respect, among others, perlite presents serious problems not encountered in the treatment of other materials. Even with the most careful grading (which greatly increases the cost) it is not possible to obtain material of sufficiently uniform grain size to respond alike to expanding temperatures. If the larger grains be expanded properly, the smaller grains will be excessively softened, losing their porosity and adhering to other granules and to the walls of the furnace.

According to my invention, granules of various sizes may be simultaneously expanded without pregrading; and a given granule is exposed to expanding temperatures only long enough to expand it. In its softened condition while expanding it is relatively free and unburdened by substantial contact or weight of other granules or the chamber walls which would tend to collapse the expanded particles partly or entirely, thereby reducing their bulk density. When expanded, and as a consequence of such expansion, it is automatically removed from the expanding zone. The heavier or larger particles remain in the expanding zone a longer time. I utilize the large particle bulk (i. e., lower bulk density) resulting when the granule expands to carry the particle out of the expanding zone, by subjecting the granules to an upward current of gases of such velocity as to be capable of carrying the particles away in the gas stream when adequately expanded. Until a granule expands, it remains in the highly heated expanding zone, its bulk being insufficient to be levitated by force of the gas stream. Rock impurities which do not expand, eventually fall below the heated zone and may be removed from time to time. Such impurities are thus automatically separated from the perlite.

The illustrative furnace is characterized by a generally vertical, elongated cylindrical chamber 10 open at the upper and lower ends and surrounded by refractory walls 11. The chamber 10 is heated preferably by liquid or gaseous fuel introduced through the opening 12 at the bottom of the chamber. The gases of combustion in highly heated condition travel upwardly at such velocity that the upward force thereof is sufficient to levitate or carry upward the perlite which has expanded and thereby reduced its bulk density. The force is not sufficient to carry up unexpanded or insufficiently expanded material. The latter material thus is permitted to remain in the hot or expanded zone of the furnace for a time long enough to expand it, when it also can be carried up and away as aforesaid.

Thus, the larger granules of ore which take longer to heat remain in the expanding zone for an appropriate length of time, yet the finer material which is more readily heated is removed as soon as it expands. Rock or other unexpandable or unexpanded impurities eventually falls down through the narrow annular opening between the walls of the furnace and the burner nozzle 13. The latter preferably has a reduced portion 14 through which the gases travel at such high velocity that the material cannot fall into the nozzle even in its relatively heavy condition as unexpanded ore.

As the gases burn and are thereby heated they expand very substantially, and though the section of the chamber is larger than that of the nozzle 13, the gas velocity nevertheless has sufficient force to levitate the granules as they expand. At a velocity of about 1100 feet per minute the hot gases exert enough force to levitate expanded granules whose bulk density is about 8 pounds per cubic foot.

The fuel supply is preferably provided with means, the details of which form no part of this invention and are readily obtainable on the market, for adjusting the rate of fuel feed, thereby to vary the velocity of hot gases through the chamber. One appropriate fuel supply and regulating means is disclosed in said co-pending application Serial No. 774,614.

The high temperature zone of the furnace extends well below the point 15 at which the granules of perlite ore to be expanded, are introduced. The point 15 is high enough in the chamber to insure heating of the granules to expanding temperatures as they fall; but as soon as the bulk density is reduced by expansion their travel is reversed and they are carried up and out of the top of the furnace.

Any appropriate means 16 for feeding the raw ore into the chamber may be employed. Preferably the granules are introduced into the expanding chamber in a diverging stream so that on entering the chamber they scatter across its entire section. The feeding means is advantageously provided with some device for adjusting the rate of feed. The details of the feeding mechanism form no part of the present invention. The feeding mechanism here illustrated is described in detail in said co-pending application Serial No. 774,614.

As here shown the hot gases carry the expanded granules out of the top of the chamber where they are deflected by the shield 17 into a collecting bin 18.

The expanding chamber is advantageously lined with a refractory metal liner 19, flexibly supported from the upper portion of the chamber and hanging freely therein and spaced from the refractory walls of the chamber. Periodic vibration or jarring of the liner serves to dislodge any material adhering thereto. The liner may advantageously be made of stainless steel to withstand the high temperatures in the expanding chamber. Such liner and the mechanism for jarring or vibrating it are disclosed in detail and claimed in said co-pending application Serial No. 774,614. A pyrometer 20 in contact with the outer surface of the liner in the region of the expanding zone serves to indicate approximate temperatures in the expanding zone.

In an expanding furnace like that here illustrated having an internal diameter of 18 inches, 2000 cubic feet of natural gas per hour mixed with 1800 cubic feet of air will create a temperature during expanding operations, of about 1700 degrees F., on the outside of liner 18 about 3 feet above the point where combustion starts. The temperature of the gases is of course substantially above the latter temperature (being about 3000 degrees F.), but the effective temperature, that is the temperature to which the granules of perlite are heated, is about 1700 to 1900 degrees F. At their combustion temperature, the gases expand to such volume that the velocity of the gases up the furnace is about 1100 feet per minute. This is sufficient to provide the force necessary to levitate perlite granules having a maximum bulk density of about 8 pounds per cubic foot, and thereby to carry them out of the furnace as when they expand.

It will be understood that the specific ore feeding means 16, fuel supply means 21, and gas nozzle 13, illustrated in the drawing, are those disclosed and claimed in said co-pending application Serial No. 774,614, and that their details form no part of the present invention.

Obviously the invention is not limited to the details of the illustrative method and apparatus, since these may be variously modified. Moreover, it is not indispensable that all features of the invention be used conjointly since various features may be used to advantage in different combinations and sub-combinations.

Having described my invention, I claim:

1. The method of expanding intumescing mineral materials which comprises directing upwardly through an elongated chamber open at its upper and lower ends a stream of hot gases having a high temperature expanding zone at a temperature above that at which the materials intumesce, adjusting the velocity of said gases at and above said high temperature zone to a value which will levitate the material in intumesced condition and carry it out of the chamber with the gases but will not levitate the material until it has intumesced, feeding a stream of said material in granular form into said chamber so that it falls downwardly into the high temperature zone of said gases and is heated thereby until it is intumesced and levitated by the upward force of said rising hot gases, and separating the intumesced material from the hot gases after it is carried thereby from said chamber.

2. The method of expanding perlite which comprises directing upwardly through an elongated chamber a stream of hot gases having a high temperature expanding zone at a temperature above that at which the perlite intumesces, adjusting the velocity of said gases at and above said high temperature zone to a value which will levitate the perlite when it has expanded and will carry it out of the chamber with said gases but will not levitate the material until it has expanded, feeding perlite of varying grain sizes into the high temperature zone of said gases from above said zone to heat the perlite as it falls, said gases heating said perlite to expanding temperatures as it thus falls and thereby causing the same to expand and being adapted to carry upwardly the particles of perlite as and when they expand to low bulk density, unexpandable material falling downwardly out of the lower end of said chamber, and separating the expanded perlite from the hot gases after it is carried thereby out of said chamber.

3. The method of expanding perlite which comprises directing upwardly through an elongated chamber a stream of hot gases having a high temperature expanding zone at a temperature above that at which the perlite will expand, feeding granules of perlite into said stream of gases at a point substantially above their origin so that said granules fall downwardly in said stream and are quickly heated thereby during said fall, adjusting the velocity of said gases so that when said granules have expanded substantially to reduce their bulk density they will be levitated by said gases and carried upwardly thereby out of said chamber, and separating the expanded perlite from the hot gases after they issue from said chamber.

4. The method of expanding perlite ore in granular condition which comprises directing upwardly through an elongated chamber open at upper and lower ends a stream of hot gases having a high temperature expanding zone in the lower portion of the chamber at a temperature above that at which the perlite granules will expand, adjusting the velocity of said gases at and above said high temperature zone to a value which will levitate the perlite when it has expanded and will carry it out of the chamber with said gases but will not levitate the material until it has expanded, feeding perlite granules into said chamber and allowing the same to fall freely by gravity into said high temperature zone to heat the granules to soften and expand same to a bulk density low enough to be levitated by the upward force of said stream of hot gases, carrying the softened expanded granules upwardly with said stream of hot gases in relatively separated condition until said granules have hardened sufficiently to sustain themselves in expanded condition, the upward force of said gases being incapable of levitating unexpanded material which eventually falls out of the lower end of said chamber, and then carrying the expanded material from the upper portion of said chamber and separating the same from the hot gases.

5. The method of expanding perlite ore in granular condition which comprises directing upwardly through an elongated chamber open at its upper end a stream of hot gases having a high temperature expanding zone in the lower portion of the chamber at a temperature substantially above that at which perlite granules will expand, adjusting the velocity of said gases at and above said high temperature zone to a value which will levitate the perlite when it has expanded and will carry it out of the chamber with said gases but will not levitate the material until it has expanded, feeding perlite granules into said chamber and allowing the same to fall freely by gravity into said high temperature zone in relatively separated condition to be heated in said high temperature zone to soft condition and to be expanded to a bulk density low enough to be levitated by the upward force of said stream of hot gases, whereby the softened expanded granules are carried upwardly with said stream of hot gases in relatively separated condition until said granules have hardened sufficiently to sustain themselves in expanded condition, said adjustment of the upward force of said gases being such as to be incapable of levitating the unexpanded material, and whereby said expanded granules are carried from the upper portion of the chamber for subsequent separation from said hot gases.

ERNEST O. HOWLE.

REFERENCES CITED

The following references are of record in the file of this patent:

UNITED STATES PATENTS

| Number | Name | Date |
| --- | --- | --- |
| 821,996 | Ellis | May 29, 1906 |
| 920,333 | Hughes | May 4, 1909 |
| 2,112,643 | Baensch et al. | Mar. 29, 1938 |
| 2,119,790 | McGehee et al. | June 7, 1938 |
| 2,334,578 | Potters | Nov. 16, 1943 |
| 2,421,902 | Neuschotz | June 10, 1947 |